UNITED STATES PATENT OFFICE.

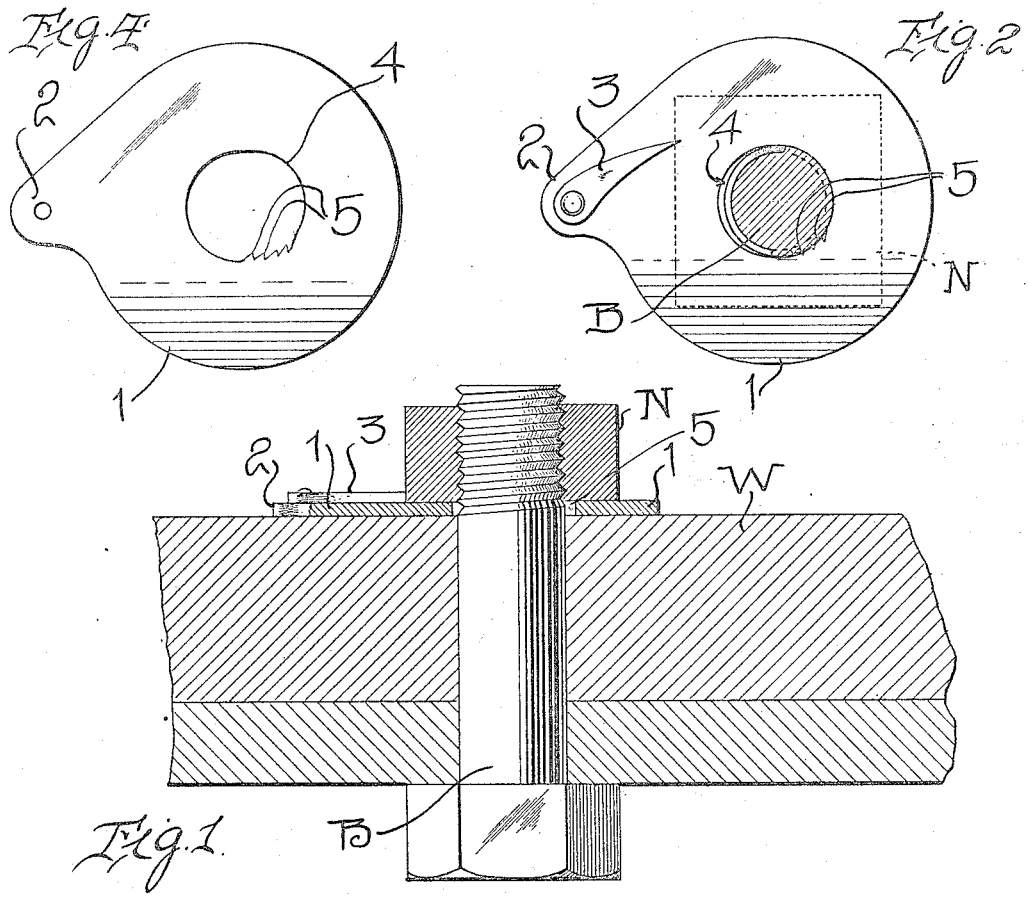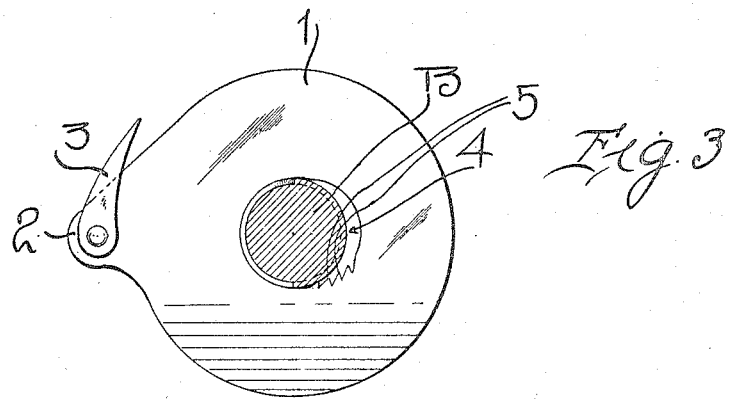

WARD CALDWELL, OF DEKALB COUNTY, NEAR LELAND, ILLINOIS.

NUT-LOCK.

1,127,586. Specification of Letters Patent. Patented Feb. 9, 1915.

Application filed October 8, 1914. Serial No. 865,696.

*To all whom it may concern:*

Be it known that I, WARD CALDWELL, a citizen of the United States, residing at Dekalb county, near Leland, in the county of La Salle and State of Illinois, have invented certain new and useful Improvements in Nut-Locks, of which the following is a specification, reference being had to the accompanying drawings.

This invention relates to certain improvements in nut locks, and the object of the invention is to provide a novel and improved means coacting with the bolt and nut whereby the nut is effectively maintained against retrograde movement independently of the bolt.

The invention consists in the details of construction and in the combination and arrangement of the several parts of my improved nut lock whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view, partly in elevation and partly in section, illustrating a nut lock constructed in accordance with an embodiment of my invention in applied position; Fig. 2 is a plan view of my improved device in operative position, with the coacting bolt shown in section and the coacting nut indicated by dotted lines. Fig. 3 is a view similar to Fig. 1 but illustrating my device in unlocked adjustment, the coacting bolt being shown in section with the nut omitted; and Fig. 4 is a plan view of my improved device detached, with the biting dog thereof omitted.

As disclosed in the accompanying drawings, B denotes a bolt of conventional construction and N an ordinary nut adapted to coact therewith. As herein embodied, my improved lock comprises a washer member 1 adapted to be inserted between the work W and the nut N and provided with the lateral extension 2 having pivotally engaged therewith the biting dog or pawl 3 adapted to engage and impinge a face of the nut N. It is also to be observed that the bore 4 of the washer is elongated and disposed longitudinally of the washer and a portion of the end of the opening remote from the extension 2 and to one side of the transverse center of the opening is provided with the teeth 5 adapted to engage the bolt B in a manner which is believed to be self-evident, whereby the nut N and the bolt B will be effectively locked against independent retrograde movement. It is to be observed that the teeth 5 and the dog or pawl 3 are disposed in a direction opposite to the winding direction of the threads of the nut and bolt whereby it will be perceived that when the nut has been properly engaged upon the bolt, it is only necessary to give a slight, reverse movement to the nut to automatically cause the locking action of the teeth 5 and pawl or dog 3.

From the foregoing description, it is thought to be obvious that a nut lock constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice except as defined by the appended claim.

I claim:

A device of the character described comprising a washer member provided with an extension, the bore of the washer member being elongated and disposed longitudinally of the washer, the wall of the bore at the end thereof remote from the extension and to one side of the transverse center of the bore being provided with inwardly disposed teeth, the remaining portion of the wall of the bore being free and unobstructed, and a pawl pivotally mounted upon the extension and having its free extremity pointed.

In testimony whereof I hereunto affix my signature in the presence of two witnesses.

WARD CALDWELL.

Witnesses:
 ROBT. J. DICKSON,
 H. G. HUPP.